United States Patent
Kuboyama

(10) Patent No.: US 9,342,189 B2
(45) Date of Patent: May 17, 2016

(54) INFORMATION PROCESSING APPARATUS AND INFORMATION PROCESSING METHOD FOR OBTAINING THREE-DIMENSIONAL COORDINATE POSITION OF AN OBJECT

(71) Applicant: CANON KABUSHIKI KAISHA, Tokyo (JP)

(72) Inventor: Hideo Kuboyama, Yokohama (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 14/178,386

(22) Filed: Feb. 12, 2014

(65) Prior Publication Data
US 2014/0232696 A1    Aug. 21, 2014

(30) Foreign Application Priority Data

Feb. 21, 2013   (JP) .................................. 2013-032443
Dec. 25, 2013   (JP) .................................. 2013-268089

(51) Int. Cl.
G06F 3/042   (2006.01)
G06F 3/00    (2006.01)
G06F 3/03    (2006.01)

(52) U.S. Cl.
CPC .............. *G06F 3/0425* (2013.01); *G06F 3/005* (2013.01); *G06F 3/0304* (2013.01)

(58) Field of Classification Search
CPC .............................. G06F 3/0425; G06F 3/0426
USPC ......................................................... 345/173
See application file for complete search history.

(56) References Cited

U.S. PATENT DOCUMENTS

| | | | | |
|---|---|---|---|---|
| 2001/0022861 | A1* | 9/2001 | Hiramatsu | 382/291 |
| 2005/0226505 | A1* | 10/2005 | Wilson | 382/180 |
| 2006/0214926 | A1* | 9/2006 | Kolmykov-Zotov et al. | 345/179 |
| 2009/0103780 | A1* | 4/2009 | Nishihara et al. | 382/103 |
| 2011/0154233 | A1* | 6/2011 | Lamarca et al. | 715/764 |
| 2012/0050194 | A1* | 3/2012 | Tanaka et al. | 345/173 |

FOREIGN PATENT DOCUMENTS

JP    10-177449 A    6/1998
JP    2011-022945 A  2/2011

* cited by examiner

*Primary Examiner* — Ram Mistry
(74) *Attorney, Agent, or Firm* — Rossi, Kimms & McDowell LLP

(57) ABSTRACT

A designation position by an operation object is specified based on a captured image that is captured by a capturing unit and reflects distance information between the capturing unit and the operation object. The direction of the operation object is specified based on the captured image. It is determined, based on the image information of a portion corresponding to the designation position out of the captured image and the direction of the operation object, that the distance between the operation object and the target surface is smaller than a predetermined value.

14 Claims, 19 Drawing Sheets

F I G. 5A
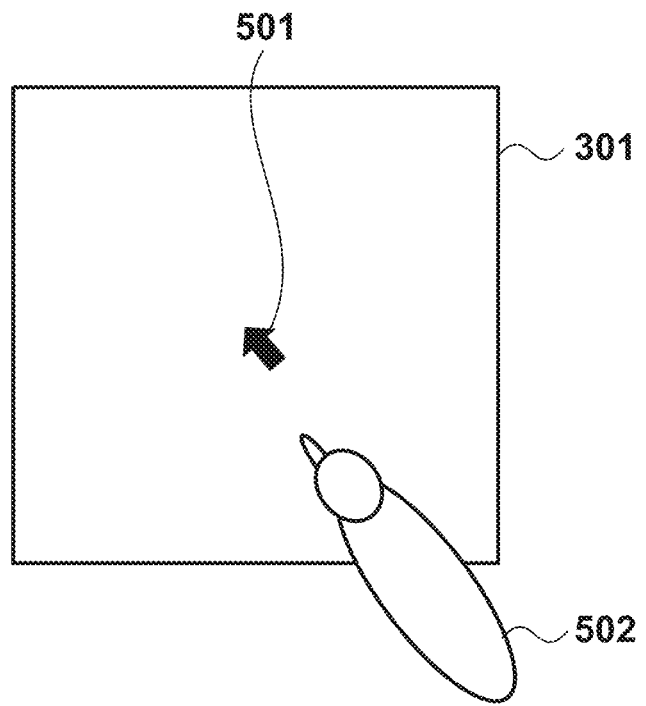
F I G. 5B
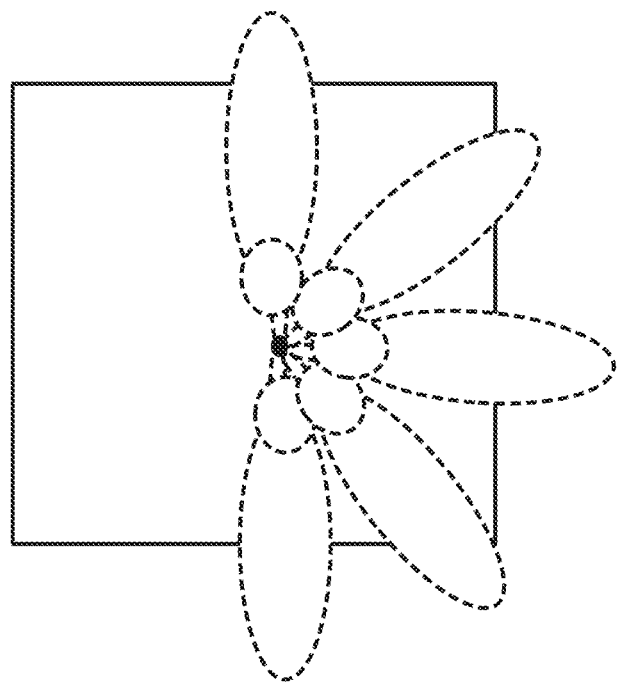

◆ : ANGLES AND INTENSITY DATA ACQUIRED TO
    DECIDE CORRECTION PARAMETERS

F I G. 10

| UI EVENT | CONTENTS |
|---|---|
| FINGER_DETECTED | DETECT FINGERTIP AT ANGLE OF VIEW |
| FINGER_MOVE | FINGERTIP MOVES BY PREDETERMINED DISTANCE |
| FINGER_STILL | FINGERTIP POSITION STANDS STILL FOR PREDETERMINED TIME |
| FINGER_UNDETECTED | FINGERTIP DISAPPEARS FROM ANGLE OF VIEW |
| TOUCH_START | FINGERTIP TOUCHES FLAT PLATE |
| TOUCH_MOVE | FINGERTIP TOUCHING MOVES BY PREDETERMINED DISTANCE |
| TOUCH_STILL | FINGERTIP TOUCHING STANDS STILL FOR PREDETERMINED TIME |
| TOUCH_END | FINGERTIP TOUCHING SEPARATES FROM FLAT PLATE |
| TOUCH_TAP | FINGERTIP TOUCHES AND SEPARATES WITHIN PREDETERMINED TIME |
| TOUCH_FLICK | FINGERTIP TOUCHING MOVES AT PREDETERMINED SPEED AND SEPARATES FROM FLAT PLATE |

F I G. 12
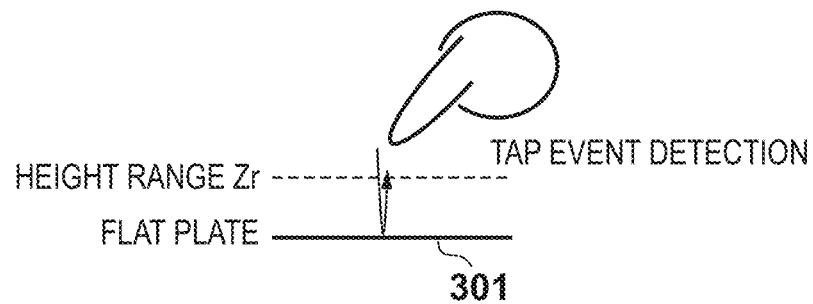
F I G. 13
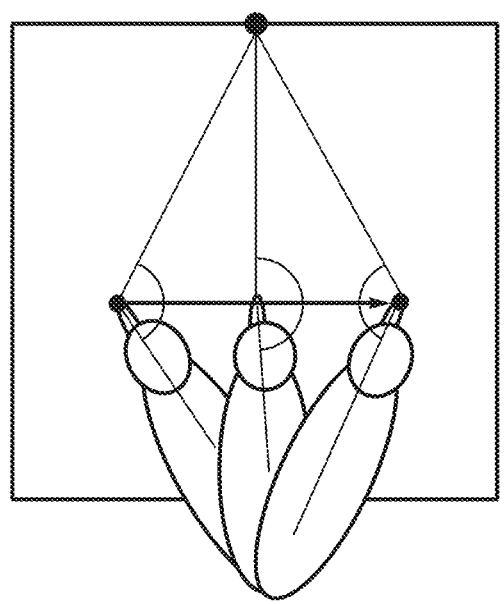

F I G. 16A
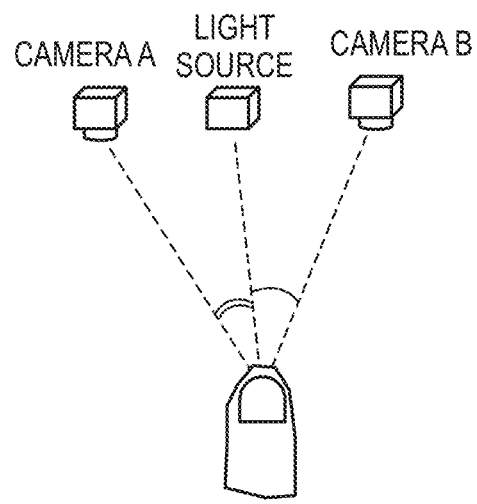
F I G. 16B
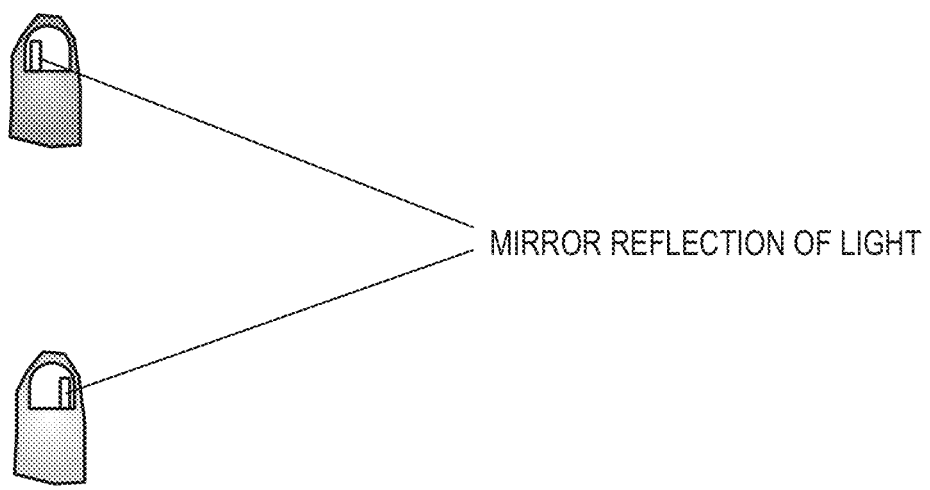

INFORMATION PROCESSING APPARATUS AND INFORMATION PROCESSING METHOD FOR OBTAINING THREE-DIMENSIONAL COORDINATE POSITION OF AN OBJECT

BACKGROUND OF THE INVENTION

1. Field of the Invention

The present invention relates to a technique for obtaining the three-dimensional coordinate position of an operation object.

2. Description of the Related Art

A device operation according to a gesture recognition technique of detecting a user's hand region using a visible light camera or an infrared camera and operating an operation input component (user interface) in accordance with the motion or position of the region is becoming widespread. In these apparatuses, a hand or a finger is detected in an image input from a camera, and an operation event is detected based on its position or motion. In patent literature 1 (Japanese Patent Laid-Open No. 10-177449), light is emitted at a predetermined or temporally changing timing. The intensity of reflected light is converted into the distance value of an object, thereby implementing a gesture input or pointing operation. In patent literature 2 (Japanese Patent Laid-Open No. 2011-22945), a fingertip is detected from an image input by an infrared camera. A rest of the fingertip is detected, thereby generating input event information.

To recognize a touch operation or a gesture operation by a user's finger, the three-dimensional coordinates of the fingertip are needed to be accurately estimated. Although the position or motion in an image can be captured, it is difficult to accurately obtain the three-dimensional coordinates of the fingertip using one camera. In patent literature 2, the operation is performed by sensing a rest of a fingertip without acquiring its three-dimensional coordinates. In patent literature 1, an object is irradiated with light, and the intensity of reflected light is converted into the distance value of the object. However, a change in reflected light caused by the reflection characteristic or surface orientation of the object is neglected. Actually, the intensity (luminance) of the reflected light changes depending on the direction of the finger with respect to the camera or the light source in practice, making it difficult to accurately acquire the distance. It is therefore difficult to accurately detect an operation event by the direction of a finger.

SUMMARY OF THE INVENTION

The present invention has been made in consideration of the above-described problems, and provides a technique for more accurately obtaining the three-dimensional coordinate position of an operation object.

According to the first aspect of the present invention, an information processing apparatus for recognizing a touch operation on a target surface by an operation object, comprising: a position specification unit configured to specify a designation position by the operation object based on a captured image that is captured by a capturing unit and reflects distance information between the capturing unit and the operation object; a direction specification unit configured to specify a direction of the operation object based on the captured image; and a determination unit configured to determine, based on image information of a portion corresponding to the designation position out of the captured image and the direction of the operation object, that a distance between the operation object and the target surface is smaller than a predetermined value.

According to the second aspect of the present invention, an information processing apparatus for recognizing a touch operation on a target surface by an operation object, comprising: a position specification unit configured to specify a position of a distal end portion of the operation object based on a captured image obtained by causing a capturing unit to capture the operation object; a direction specification unit configured to specify an orientation of the distal end portion of the operation object with respect to the capturing unit based on the captured image; and a recognition unit configured to recognize a touch on the target surface by the distal end portion of the operation object based on image information corresponding to the distal end portion out of the captured image and an orientation of the distal end portion with respect to the capturing unit.

According to the third aspect of the present invention, an information processing method of recognizing a touch operation on a target surface by an operation object, comprising: a position specification step of specifying a designation position by the operation object based on a captured image that is captured by a capturing unit and reflects distance information between the capturing unit and the operation object; a direction specification step of specifying a direction of the operation object based on the captured image; and a determination step of determining, based on image information of a portion corresponding to the designation position out of the captured image and the direction of the operation object, that a distance between the operation object and the target surface is smaller than a predetermined value.

Further features of the present invention will become apparent from the following description of exemplary embodiments with reference to the attached drawings.

BRIEF DESCRIPTION OF THE DRAWINGS

FIGS. 5A and 5B are views showing examples of projected information and finger placement;

FIG. 10 is a table showing the correspondence between a gesture operation and an event;

FIG. 12 is a view for explaining a tap event;

FIG. 13 is a view showing a state in which the angle of a fingertip changes upon drag;

FIGS. 16A and 16B are views showing a change in a fingertip image caused by a plurality of cameras;

DESCRIPTION OF THE EMBODIMENTS

The embodiments of the present invention will now be described with reference to the accompanying drawings. Note that the embodiments to be described below are examples of detailed implementation of the present invention or detailed examples of the arrangement described in the appended claims.

First Embodiment

Figure 1:
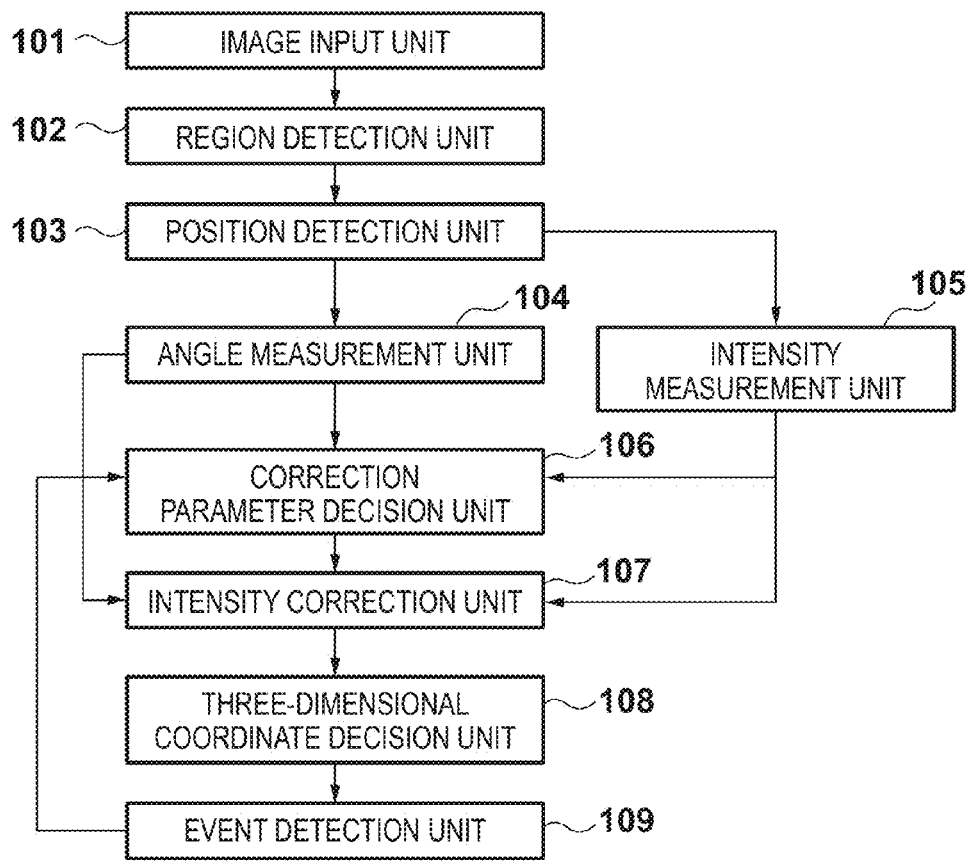
FIG. 1 is a block diagram showing an example of the functional arrangement of an image processing apparatus.

An example of the functional arrangement of an image processing apparatus (information processing apparatus) according to this embodiment will be described with reference to the block diagram of FIG. 1. Note that in this embodiment, an image processing apparatus including the units shown in FIG. 1 will be explained. However, several functional units may be included in an external device.

An image input unit 101 sequentially acquires the image (captured image) of each frame captured by a camera to be described later, and sends the acquired captured image to a region detection unit 102 of the subsequent stage.

The region detection unit 102 detects, from the captured image received from the image input unit 101, a region including an operation object as an operation object region. The operation object can be, for example, a user's hand or a tool such as a pen or a stylus held by a user's hand.

A position detection unit 103 detects the distal end portion of the operation object from the operation object region detected by the region detection unit 102, and detects its image coordinates. When the operation object is, for example, a user's hand, the distal end portion of the operation object is a fingertip. When the operation object is a rod-shaped tool such as a pen or a stylus, the distal end portion of the operation object is the other end of the tool that is not held by the user's hand. For the descriptive convenience, the operation object is assumed to be a human hand in the following explanation.

An angle measurement unit 104 obtains a value (strictly speaking, an inner product value, as will be described later) indicating the direction of the finger in the captured image from the operation object region detected by the region detection unit 102. An intensity measurement unit 105 acquires the intensity value of the fingertip detected by the position detection unit 103.

A correction parameter decision unit 106 obtains correction parameters used to correct the intensity value of the fingertip in the captured image to a desired intensity value to be described later using the direction obtained by the angle measurement unit 104 and the intensity value acquired by the intensity measurement unit 105.

An intensity correction unit 107 corrects the intensity value (the intensity value acquired by the intensity measurement unit 105) of the fingertip in the captured image to the desired intensity value using the correction parameters obtained by the correction parameter decision unit 106.

A three-dimensional coordinate decision unit 108 decides the three-dimensional coordinate values of the fingertip by obtaining the distance from the camera to the fingertip to be described later using the captured image after correction by the intensity correction unit 107. An event detection unit 109 executes an event corresponding to a change with respect to the three-dimensional coordinate position decided by the three-dimensional coordinate decision unit 108 or a formerly obtained three-dimensional coordinate position.

Figure 2:
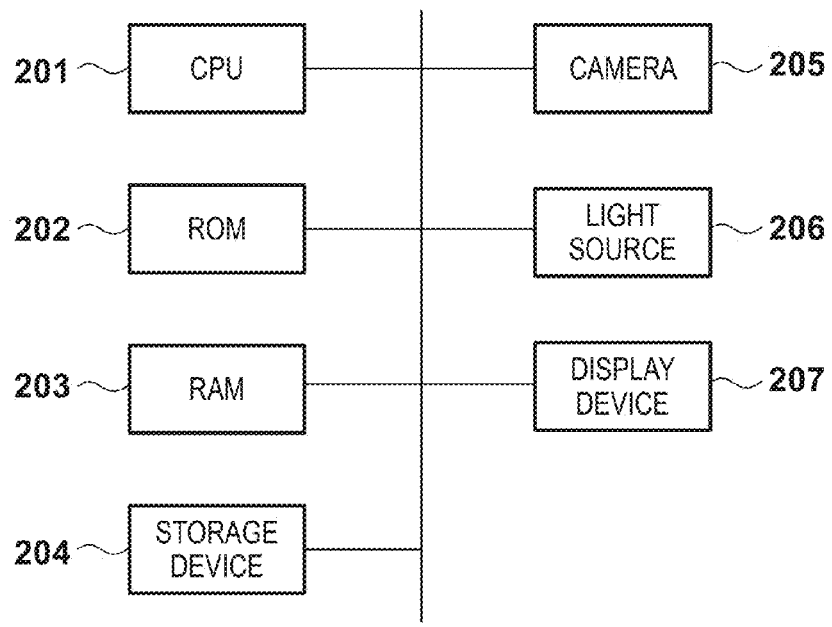
FIG. 2 is a block diagram showing an example of the hardware arrangement of the image processing apparatus.

An example of a hardware arrangement for implementing the functional arrangement shown in FIG. 1 will be described with reference to the block diagram of FIG. 2. A CPU 201 executes processing using computer programs and data stored in a ROM 202 or a RAM 203, thereby controlling the operation of the entire image processing apparatus and also executing each process to be described later as a process to be performed by the image processing apparatus.

The ROM 202 stores the setting data, boot program, and the like of the image processing apparatus. The RAM 203 includes an area to temporarily store computer programs and data loaded from the ROM 202 or a storage device 204, and an area to temporarily store the captured image of each frame sent from a camera 205. The RAM 203 also includes a work area used by the CPU 201 to execute various kinds of processing. That is, the RAM 203 can provide various areas as needed.

The storage device 204 stores the OS (Operating System), and computer programs and data used to cause the CPU 201 to execute each process to be described later as a process to be performed by the image processing apparatus. The storage device 204 also stores information to be handled as known information in the following explanation. The computer programs stored in the storage device 204 include a computer program that causes the CPU 201 to execute the function of each unit shown in FIG. 1.

The computer programs and data stored in the storage device 204 are loaded to the RAM 203 as needed under the control of the CPU 201 and processed by the CPU 201.

The camera 205 captures the upper surface of a flat plate that is the space in which the user makes a gesture by the hand of his/her own. A light source 206 irradiates the user's hand with light. In this embodiment, the light source 206 is assumed to be an infrared light source that emits infrared light, and the camera 205 is assumed to be an infrared camera that senses the intensity of the infrared light. However, the following description is obviously not limited to the light source 206 being an infrared light source and the camera 205 being an infrared camera.

A display device 207 is a projector that projects a user interface and various kinds of information such as an image and characters on a flat plate to be described later. Note that the flat plate itself may be used as the display device 207.

Note that in this embodiment, an image processing apparatus having the hardware arrangement shown in FIG. 2 will be explained. However, any other arrangement may be employed if similar functions can be implemented. In addition, not all the functional units shown in FIG. 2 need be included in the image processing apparatus. For example, the camera 205, the light source 206, and the display device 207 may externally be connected to the image processing apparatus as the external devices of the image processing apparatus.

Figure 3:
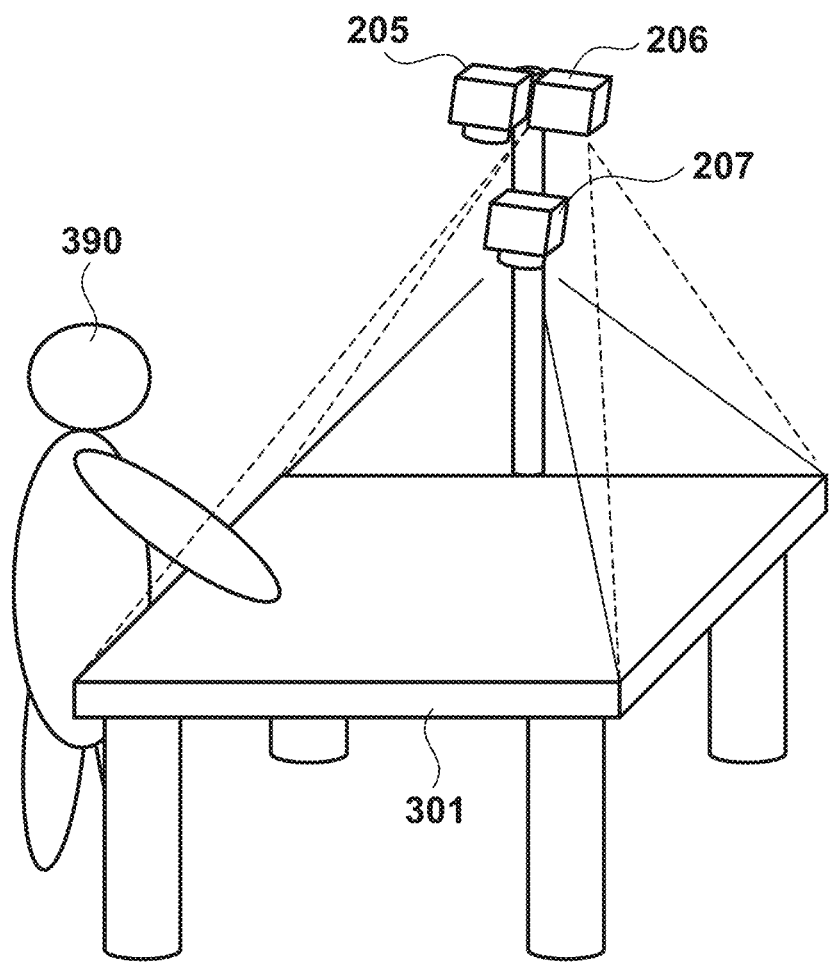
FIG. 3 is a perspective view showing a representative example of installation of the image processing apparatus.

FIG. 3 shows a representative example of installation of the image processing apparatus according to this embodiment. The light source 206 that irradiates a flat plate 301 with infrared light, the camera 205 that acquires the reflected light of the infrared light emitted by the light source 206 as a captured image, and the display device 207 that projects the above-described various kinds of information onto the flat plate 301 are provided above the flat plate 301.

A user 390 performs, by his/her finger, a gesture operation such as a touch, drag, or flick for the user interface or an image or characters projected onto the flat plate 301. The state on the flat plate 301 is captured by the camera 205 as a captured image. This captured image is used to estimate the three-dimensional coordinate position of the fingertip, as will be described later. Note that as described above, the placement example shown in FIG. 3 is merely an example, and another placement may be employed.

Figure 4:
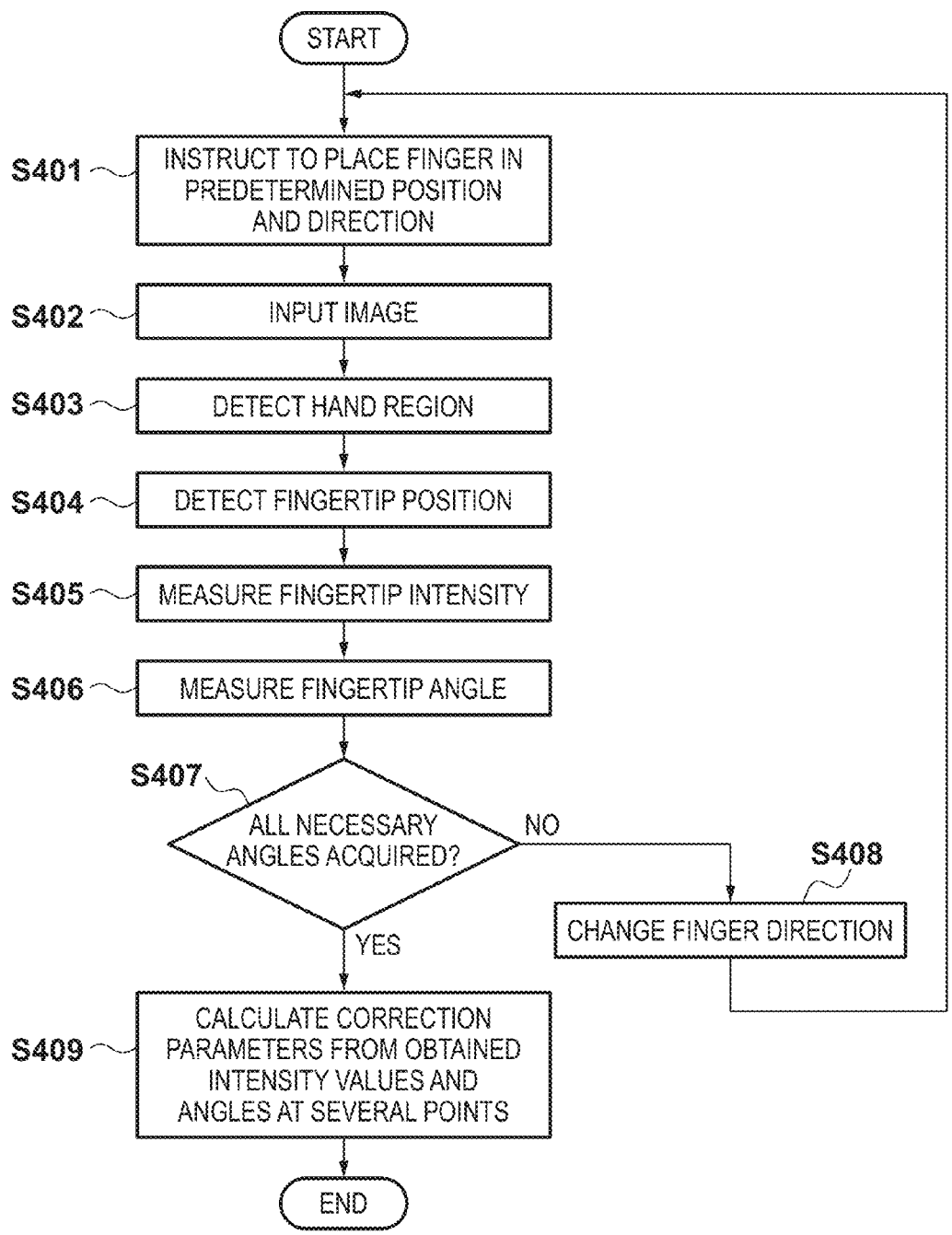
FIG. 4 is a flowchart showing processing of obtaining correction parameters and registering them in a storage device 204.

Processing of obtaining correction parameters used to correct the intensity value of a fingertip in a captured image, which changes depending on the orientation of the finger on the flat plate 301, and registering (outputting) them in the storage device 204 will be described next with reference to the flowchart of FIG. 4. Processing shown in the flowchart of FIG. 4 is processing of obtaining, in advance from a calibration operation, a parameter used to correct the influence of the use environment on the intensity value of the fingertip in the captured image. In this embodiment, a line having the orientation of the camera 205 in the two-dimensional plane of the flat plate 301 as the direction vector is defined as the base axis, and focus is placed on the fact that the reflection intensity of the fingertip changes depending on the orientation of the finger with respect to the base axis. Intensity value correction processing is performed to change the intensity value of the finger in the captured image to the intensity value of the fingertip in the captured image when the finger faces the camera 205 independently of the orientation of the finger with respect to the base axis.

Note that the computer program and data used to cause the CPU 201 to execute the processing according to the flowchart of FIG. 4 is stored in the storage device 204. Hence, the CPU 201 loads the computer program and data from the storage device 204 to the RAM 203, and executes the processing using the loaded computer program and data. The image processing apparatus thus executes the processing according to the flowchart of FIG. 4.

The processing according to the flowchart of FIG. 4 can be executed only once for the first time when the image processing apparatus is constructed as illustrated in FIG. 3 or at an arbitrary timing. The processing according to the flowchart of FIG. 4 may be executed for each user who performs a gesture operation on the flat plate 301.

In step S401, the CPU 201 operates as the correction parameter decision unit 106. That is, the CPU 201 controls the display device 207 to project, onto the flat plate 301, information that causes the user to place a finger in a predetermined position at a predetermined angle on the flat plate 301. FIG. 5A shows an example of the projected information.

Referring to FIG. 5A, a designation pointer 501 having an arrow shape is projected on the flat plate 301. The designation pointer 501 prompts the user to place his/her finger at the position of the head of the arrow in the orientation of the arrow. Reference numeral 502 denotes a user's arm.

Referring back to FIG. 4, in step S402, the CPU 201 operates as the image input unit 101. That is, the CPU 201 selects one of the captured images of frames sequentially sent from the camera 205 and stored in the RAM 203 or the storage device 204. The CPU 201 may cause the camera 205 to capture one image and select it, as a matter of course. The selected captured image is used from step S403.

Note that the process of step S402 is meaningless even when performed during the progress of user's finger placement on the flat plate 301. Hence, for example, the user may operate an operation unit (not shown) to input a signal representing completion of finger placement, and upon sensing this, the CPU 201 may start the processing from step S402. Alternatively, for example, the camera 205 may capture a moving image on the flat plate 301 without intervening user input. The CPU 201 may continuously extract the hand region and start the processing from step S402 when the change amount of the position or shape of the hand region has decreased to a threshold or less.

In step S403, the CPU 201 operates as the region detection unit 102. That is, the CPU 201 detects the user's hand region from the captured image selected in step S402. Various techniques are usable to detect the hand region from the captured image. In this embodiment, any technique can be employed. For example, background subtraction can be used to distinguish the hand region from the background (flat plate) region. When the camera 205 captures a color image including RGB components, a region made of a pixel group having pixel values representing a flesh color may be detected from the captured image as the hand region. In this case, the RGB values are handled as the "intensity value" to be explained in this embodiment.

In step S404, the CPU 201 operates as the position detection unit 103. That is, the CPU 201 specifies a portion that seems to be a fingertip from the hand region detected in step S403, and specifies the image coordinates of the specified portion in the captured image selected in step S402. Various methods are applicable to this specification, and any method can be employed.

For example, the three-dimensional shape models of a hand having various shapes are registered in the storage device 204 in advance in correspondence with the various shapes. Each three-dimensional shape model is fitted in the hand region detected in step S403. A position on the captured image corresponding to the fingertip of the three-dimensional shape model of the best fit is specified as the fingertip position in the captured image, and the image coordinates of this position are acquired.

Alternatively, a region extending from the frame portion of the captured image to the inside of the captured image may be detected. A position in the detected region farthest from the frame portion may be specified as the fingertip position, and the image coordinates of this position may be acquired.

In step S405, the CPU 201 operates as the intensity measurement unit 105. That is, the CPU 201 acquires the intensity distribution of intensity values in the periphery of the position on the captured image specified by the image coordinates acquired in step S404, and acquires the average of the intensity values other than the intensities (singular points) separated from the distribution as the intensity value of the fingertip in the captured image.

In step S406, the CPU 201 operates as the angle measurement unit 104. First, the CPU 201 obtains the orientation of the finger in the captured image. Various methods are usable to obtain the orientation of the finger in the captured image. For example, when the three-dimensional shape model is fitted in the hand region, the orientation of the three-dimensional shape model in the captured image is specified as the orientation of the finger in the captured image.

On the other hand, the position and orientation of the camera 205 are fixed. Additionally, the camera 205 looks down upon the whole flat plate 301 from above the flat plate 301. The height out of the three-dimensional coordinates of the camera 205 is set to the same level as the flat plate 301 to define the camera position. The direction of a line that connects the position of the camera 205 and the fingertip position is defined as the direction vector of the camera 205. The inner product value of a vector (unit vector) representing the orientation of the finger in the captured image and the direction vector (unit vector) of the camera 205 in the captured image is calculated, thereby obtaining a value (cos θ) concerning an angle θ made by the vectors.

Figure 6:
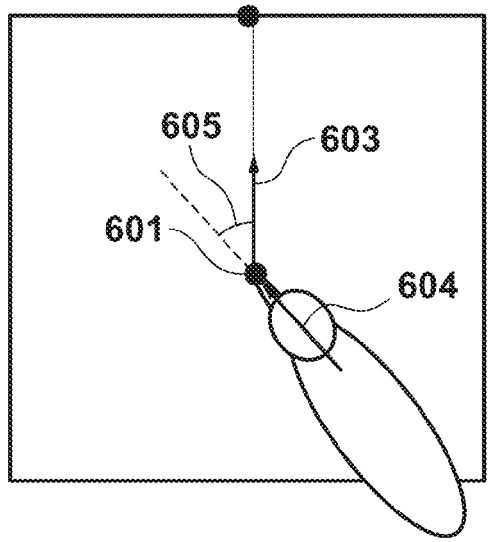
FIG. 6 is a schematic view for explaining the process of step S406.

The process of step S406 will be explained with reference to the schematic view of FIG. 6. Referring to FIG. 6, reference numeral 601 denotes a fingertip position in the captured image; 604, a vector representing the orientation of the finger in the captured image; 603, a direction vector of the camera 205 from the fingertip position in the captured image; and 605, an angle made by the vectors 603 and 604.

An inner product value of 1 indicates that the angle 605 made by the vectors 603 and 604 is 0° (the orientation of the finger and that of the camera 205 in the flat plate 301 match each other). An inner product value of 0 indicates that the angle 605 made by the vectors 603 and 604 is 90° (the orientation of the finger and that of the camera 205 in the flat plate 301 meet at a right angle). An inner product value of −1 indicates that the angle 605 made by the vectors 603 and 604 is 180° (the orientation of the finger and that of the camera 205 in the flat plate 301 face each other).

Note that the method of defining, as the base axis, a line having the orientation of the camera 205 in the flat plate 301 as the direction vector and calculating the angle representing the direction of the finger in the captured image relative to the base axis is not limited to the above-described method of calculating the inner product value, and another method may be employed.

In step S407, the CPU 201 determines whether the processes of steps S401 to S406 are executed for all predetermined angles. For example, the CPU 201 determines whether the processes of steps S401 to S406 are executed for five directions at every 45°, as shown in FIG. 5B. Upon determining that the processes of steps S401 to S406 are executed for all predetermined angles, the process advances to step S409. If the processes of steps S401 to S406 are not executed for all predetermined angles, the process advances to step S408.

In step S408, the CPU 201 operates as the correction parameter decision unit 106. That is, the CPU 201 reads out, from the storage device 204, screen data to cause the user to place the finger at the next predetermined angle (for example, an angle obtained by adding a predetermined increment to the angle previously designated in step S401). The process returns to step S401. In step S401, the CPU 201 controls the display device 207 to project, onto the flat plate 301, a screen represented by the data read out in step S408 for the user.

In step S409, the CPU 201 operates as the correction parameter decision unit 106. That is, the CPU 201 decides correction parameters using the intensity values and inner product value collected by the processes of the above-described steps. To do this, in this embodiment, a variation in the intensity value by the inner product value is approximated by a quadratic curve using a least square method.

Let Pi be the inner product value obtained for a finger orientation Di (i=0, 1, 2, . . . ), and Ii be the intensity value of the fingertip in the captured image obtained in correspondence with the orientation Di. A residual R of the quadratic curve can be defined by $$R = \sum_{i=1}^{n} \{I_i - (a + bP_i + cP_i^2)\}^2 \quad (1)$$

where a, b, and c are coefficients. The coefficients a, b, and c that minimize the residual R can be obtained by solving $$na + \left(\sum_{i=1}^{n} P_i\right)b + \left(\sum_{i=1}^{n} P_i^2\right)c = \left(\sum_{i=1}^{n} I_i\right) \quad (2)$$

$$\left(\sum_{i=1}^{n} P_i\right)a + \left(\sum_{i=1}^{n} P_i^2\right)b + \left(\sum_{i=1}^{n} P_i^3\right)c = \left(\sum_{i=1}^{n} P_i I_i\right) \quad (3)$$

$$\left(\sum_{i=1}^{n} P_i^2\right)a + \left(\sum_{i=1}^{n} P_i^3\right)b + \left(\sum_{i=1}^{n} P_i^4\right)c = \left(\sum_{i=1}^{n} P_i^2 I_i\right) \quad (4)$$

Using the obtained coefficient a, b, and c, a intensity value I of the tip of the finger oriented in the direction in which the inner product value is P in the captured image can uniquely be obtained by calculating $$I = a + bP + cP^2 \quad (5)$$

Figure 7:
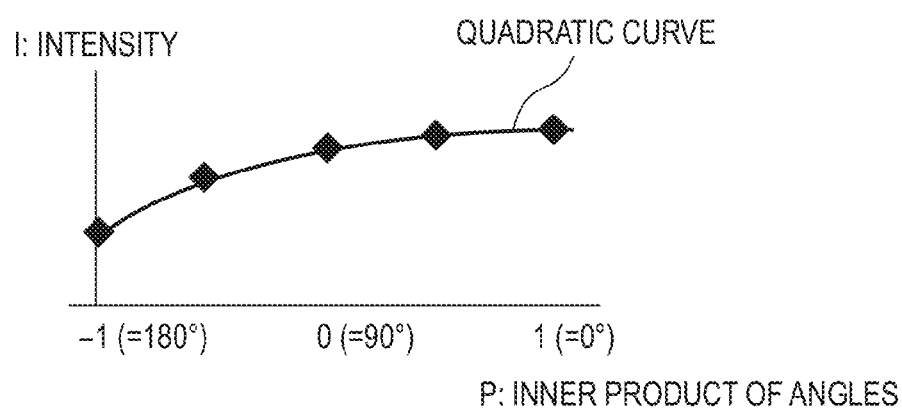
FIG. 7 is a graph showing a quadratic curve expressed by equation (5)

FIG. 7 shows a quadratic curve expressed by equation (5). An intensity value Is of the fingertip in the captured image when the orientation of the finger and that of the camera 205 in the flat plate 301 face each other can be obtained by substituting P=1 into equation (5). The intensity value Is is given by $$I_s = a + b + c \quad (6)$$

The difference between the intensity values I and Is is information used to correct the intensity value of the fingertip in the captured image to the intensity value of the fingertip in the captured image when the finger is placed such that the inner product value becomes 1. The difference between the intensity values I and Is is given by $$I_s - I = b + c - bP - cP^2 \quad (7)$$

The coefficients b and c defining the information for correction are stored in the storage device 204 as correction parameters. Note that the storage destination of the correction parameters is not limited to the storage device 204 and may be, for example, another apparatus that needs the correction parameters.

Processing performed by the image processing apparatus at the stage of actually causing the user to perform a gesture operation on the flat plate 301 to do an operation input after the registration will be described next with reference to the flowchart of FIG. 8.

Figure 8:
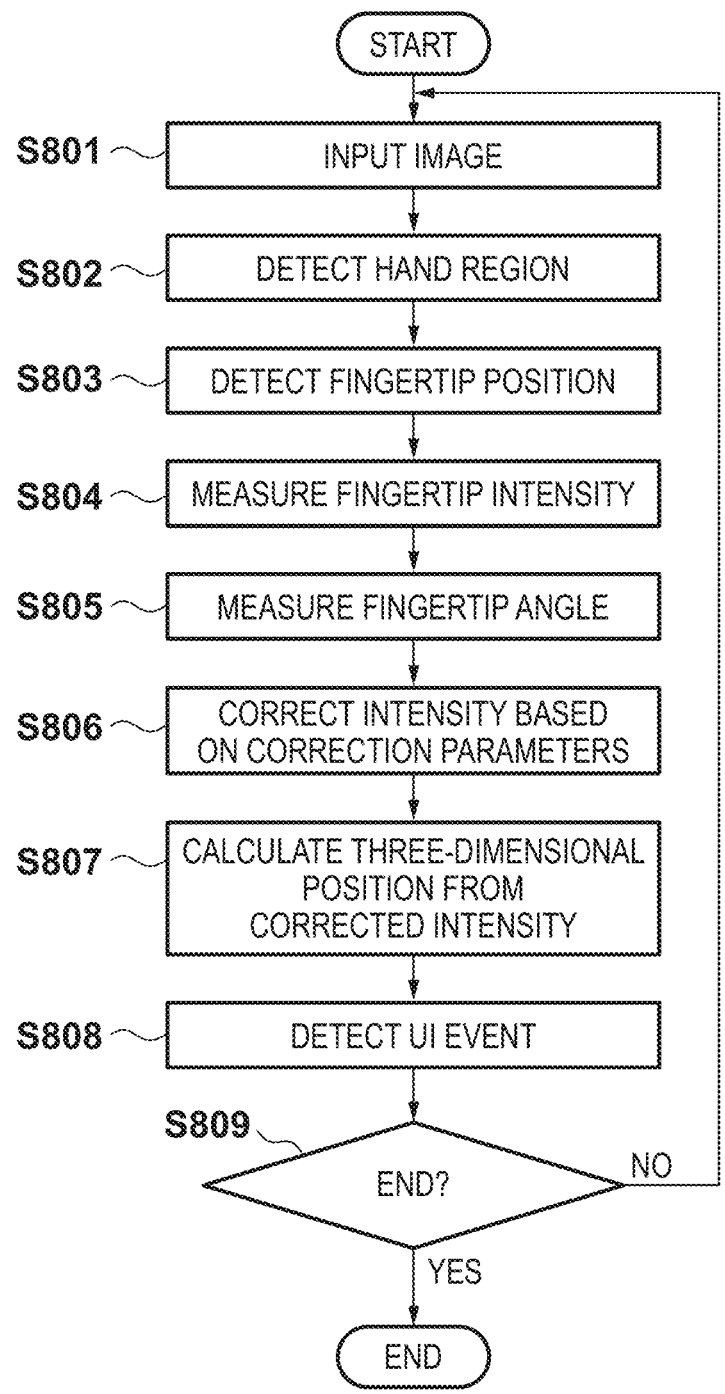
FIG. 8 is a flowchart showing processing performed by the image processing apparatus at the stage of performing a gesture operation.

Note that the computer program and data used to cause the CPU 201 to execute the processing according to the flowchart of FIG. 8 is stored in the storage device 204. Hence, the CPU 201 loads the computer program and data from the storage device 204 to the RAM 203, and executes the processing using the loaded computer program and data. The image processing apparatus thus executes the processing according to the flowchart of FIG. 8.

Note that the processes of steps S801 to S805 are the same as those of steps S402 to S406 described above, and a description of these steps will be omitted.

In step S806, the CPU 201 operates as the intensity measurement unit 105. That is, the CPU 201 can obtain a corrected intensity value Ic of the fingertip by calculating, using the inner product value P obtained from the captured image in step S805 and the intensity value I of the fingertip obtained from the captured image in step S804, $$I_c = I + b + c - bP - cP^2 \qquad (8)$$

In step S807, the CPU 201 operates as the three-dimensional coordinate decision unit 108. That is, the CPU 201 obtains the three-dimensional coordinate position of the fingertip in the physical space using the corrected intensity value Ic obtained in step S806 and the image coordinates of the fingertip in the captured image.

In general, the intensity of light monotonically decreases with respect to the distance from the light source. Since the positions and orientations of the camera 205 and the light source 206 are fixed, a distance D from the camera 205 to the fingertip is approximated by $$I_c = \frac{e}{D^2} + \frac{f}{D} + g \qquad (9)$$

In this case, e, f, and g are obtained in advance from fingertip intensity data of at least three points at different distances from the camera 205 using the least square method. When equation (9) is transformed, the distance D when the corrected intensity value Ic is given can be obtained by calculating $$D = \frac{-f + \sqrt{f^2 - 4e(g - I_c)}}{2(g - I_c)} \qquad (10)$$

Figure 9:
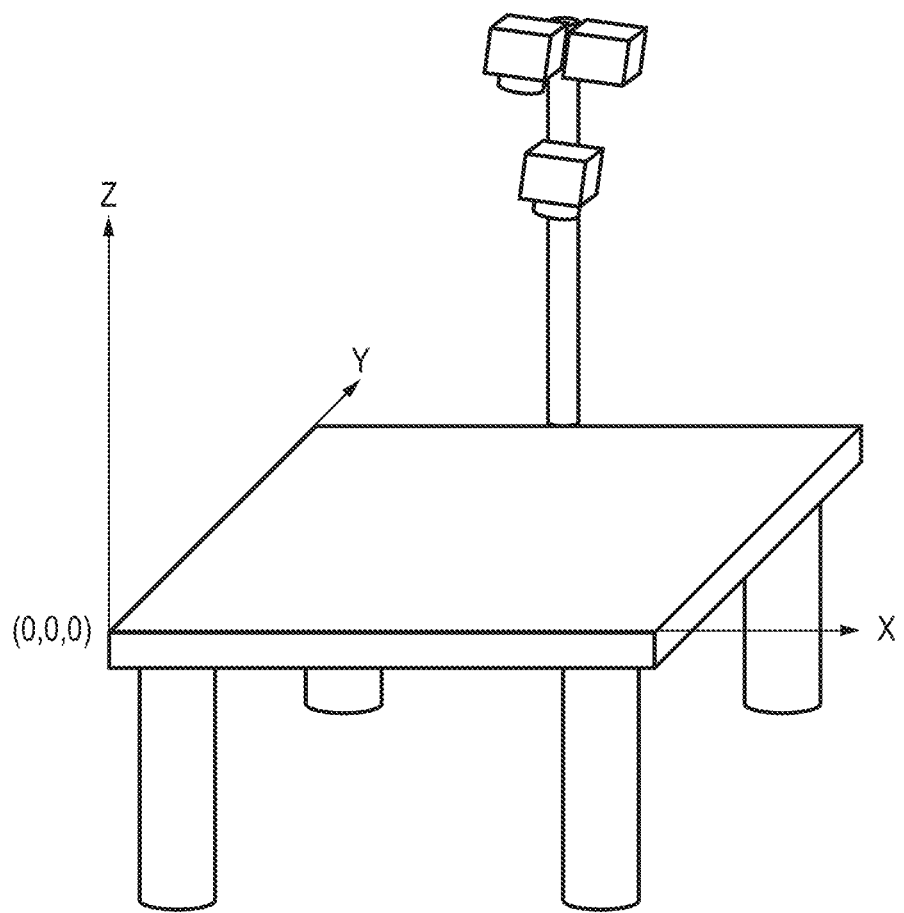
FIG. 9 is a perspective view showing an example of a world coordinate system.

Using the distance D obtained by calculating equation (10) and the image coordinates (x, y) of the fingertip in the captured image, the three-dimensional coordinates (X, Y, Z) of the fingertip on the world coordinate system can be obtained by projection transformation. The world coordinate system is a coordinate system having one point in the physical space as the origin and three axes perpendicularly crossing each other at the origin as x-, y-, and z-axes. FIG. 9 shows an example of the world coordinate system defined in this embodiment. In this embodiment, one point on the flat plate 301 is set as the origin (0, 0), the upper surface of the flat plate 301 is set as the X-Y plane (x-y plane), and the height direction of the flat plate 301 is set as the z-axis, thereby defining the world coordinate system. Projection transformation for converting the distance D and the image coordinates (x, y) into three-dimensional coordinates on the world coordinate system is done, assuming that a height Zc of the camera 205 is much larger than a height Z of the fingertip, by calculating $$\begin{bmatrix} X \\ Y \\ 1 \end{bmatrix} = \begin{bmatrix} r11 & r12 & r13 \cdot D + t1 \\ r21 & r22 & r23 \cdot D + t2 \\ r31 & r32 & r33 \cdot D + t3 \end{bmatrix}^{-1} \begin{bmatrix} fx & 0 & cx \\ 0 & fy & cy \\ 0 & 0 & 1 \end{bmatrix}^{-1} \begin{bmatrix} x \\ y \\ 1 \end{bmatrix} \qquad (11)$$

$$Z = D - Zc \qquad (12)$$

where r11 to r33, t1 to t3, fx, fy, cx, cy, and Zc are parameters determined when the camera 205 is installed, and registered in the storage device 204 in advance before the start of the processing according to the flowchart of FIG. 8.

In step S808, the CPU 201 operates as the event detection unit 109. That is, the CPU 201 detects an event corresponding to a change from the three-dimensional coordinate position obtained in step S807 or a formerly obtained three-dimensional coordinate position, and executes it. FIG. 10 shows the correspondence between a gesture operation and an event corresponding to it. One of the listed "contents" which corresponds to "a change from the three-dimensional coordinate position obtained in step S807 or a formerly obtained three-dimensional coordinate position" is searched for, and an event corresponding to it is specified from "UI events". This specified event is executed. An image such as a user interface projected from the display device 207 to the flat plate 301 can thus be operated.

In step S809, the CPU 201 determines whether to end the processing. If the condition to end the processing is met, for example, if the CPU 201 senses input of an instruction to end the processing from the operation unit (not shown), the processing ends. On the other hand, if the condition to end the processing is not met, the process returns to step S801 to repeat the subsequent processing.

As described above, the image processing apparatus according to this embodiment irradiates the operation area with, for example, infrared light from the light source, and when acquiring the reflection intensity of the fingertip by the camera and calculating the three-dimensional coordinates of the fingertip, corrects the reflection intensity that changes depending on the angle of the fingertip. This makes it possible to accurately calculate the three-dimensional coordinates independently of the angle or orientation of the fingertip and improve the operability.

Note that the arrangement of the apparatus explained in this embodiment is merely an example, as described above, and in particular, merely an example of the basic arrangement to be described below. In the basic arrangement, an information processing apparatus for recognizing a touch operation on a target surface by an operation object specifies a designation position by the operation object based on a captured image that is captured by a capturing unit and reflects distance information between the capturing unit and the operation object (position specification). The direction of the operation object is specified based on the captured image (direction specification). It is determined, based on the image information of a portion corresponding to the designation position out of the captured image and the direction of the operation object, that the distance between the operation object and the target surface is smaller than a predetermined value.

Second Embodiment

In the first embodiment, the processing of obtaining correction parameters shown in FIG. 4 is executed once when the camera 205 and the light source 206 are determined (at the time of manufacturing the apparatus) or installed in a predetermined place or for each user, thereby obtaining the correction parameters. In the second embodiment, however, an actual touch on a flat plate 301 is sensed at the time of a user operation, and the correction parameters are calculated from the angle and intensity. In the following embodiments including the second embodiment, only the difference from the first embodiment will mainly be described, and the rest is the same as in the first embodiment unless it is specifically stated otherwise.

Figure 11:
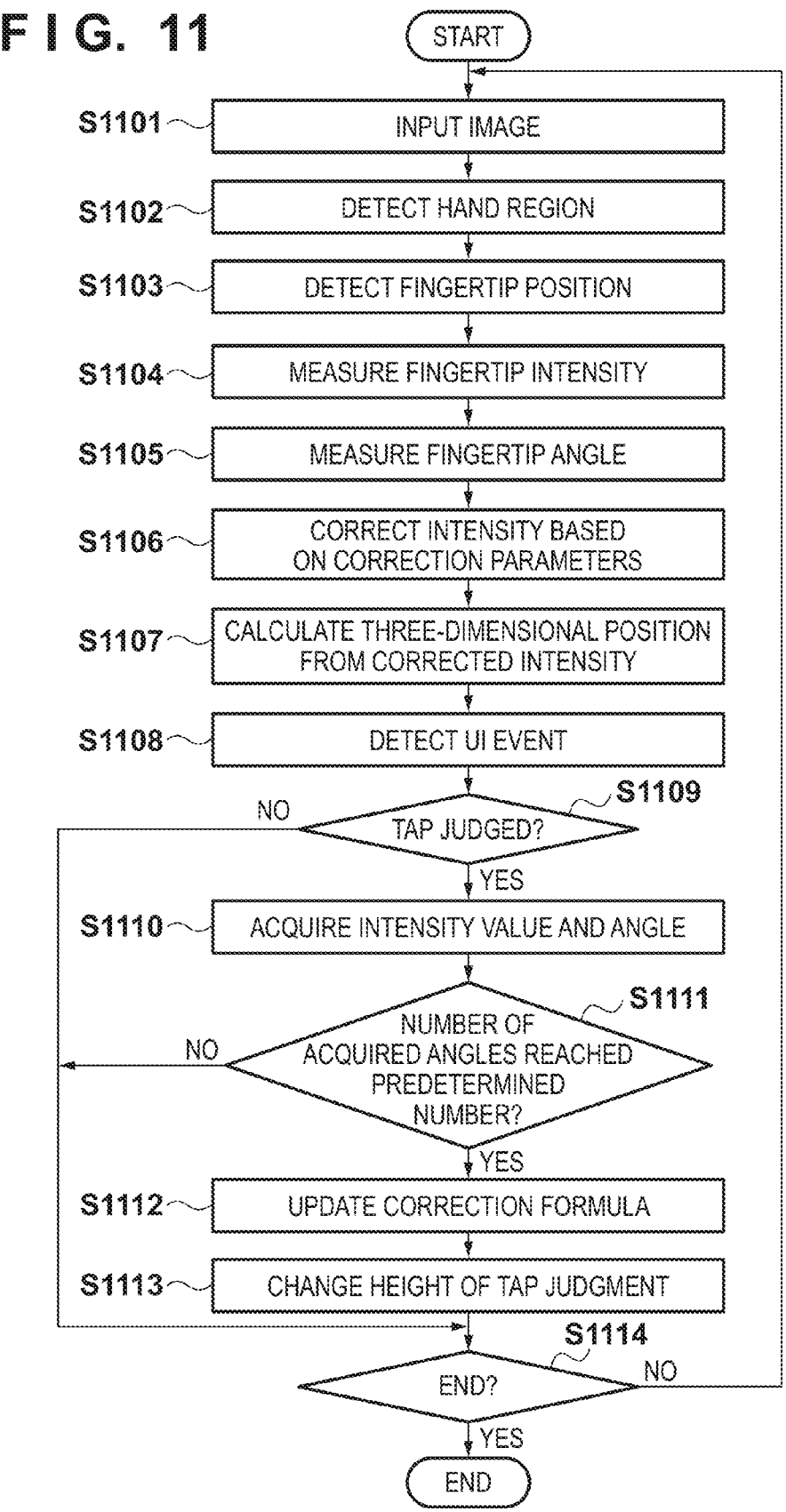
FIG. 11 is a flowchart showing processing performed by the image processing apparatus at the stage of performing a gesture operation.

This embodiment is different from the first embodiment in that processing according to the flowchart of FIG. 11 is performed in place of the processing according to the flowchart of FIG. 8. In addition, steps S1101 to S1108 and S1114 of FIG. 11 are the same as steps S801 to S809 of FIG. 8, and a description of these steps will be omitted.

In step S1109, a CPU 201 operates as an event detection unit 109. That is, the CPU 201 determines whether a tap event is detected. If a tap event is detected, the process advances to step S1110. If no tap event is detected, the processing ends.

In step S1110, the CPU 201 operates as an angle measurement unit 104 and a intensity measurement unit 105. That is, the CPU 201 acquires the inner product value and the intensity value when the finger height is minimized at a time close to the tap event issuance time. The tap event will be described with reference to FIG. 12. FIG. 12 shows a user's finger and the flat plate 301 viewed from a side.

It is difficult to strictly determine whether the user's finger has actually touched the flat plate 301 because of the arrangement of the image processing apparatus. For this reason, various touch events are judged by checking whether the Z component (height Z) of the three-dimensional coordinates of the fingertip falls within a predetermined height range Zr (within a range) with respect to the flat plate 301. The tap event occurs upon judging that the fingertip position falls within the height range Zr and goes out of the range Zr within a predetermined time. Hence, even if the accuracy of the height Z of the fingertip is not strict, the tap event can be detected. A point at which the height Z of the fingertip is minimized immediately before the detection of the tap event is defined as the tap point. Setting the height at that point of time to 0, the intensity value and the inner product value of the fingertip are acquired.

In step S1111, the CPU 201 determines whether the number of acquired sets of intensity values and inner product values has reached a predetermined number. Upon determining that the number of sets has not reached the predetermined number, the process advances to step S1114. If the number of sets has reached the predetermined number, the process advances to step S1112.

In step S1112, the CPU 201 operates as a correction parameter decision unit 106. That is, the CPU 201 performs the same process as in step S409 described above using the predetermined number of acquired sets, thereby recalculating the correction parameters.

In step S1113, the CPU 201 operates as the event detection unit 109. That is, the CPU 201 changes the height range Zr used for tap detection. Before correction parameter updating, since the height accuracy with respect to the fingertip angle is low, the height range Zr is set large to some extent to easily detect a tap. After correction parameter updating, since the height accuracy rises, the height range Zr is set small (narrow) to some extent to decrease detection errors. This can increase the tap detection accuracy.

As described above, according to this embodiment, the angle and intensity of the fingertip touching the flat plate 301 are collected even during a user operation using tap detection, and the correction parameters are recalculated, thereby further raising the accuracy. If the initially set correction parameters fall within an allocable range, correction parameter decision processing for each user or use environment can be eliminated.

Third Embodiment

In the second embodiment, the angle and intensity of the fingertip touching the flat plate 301 are collected using tap detection during an operation, and the correction parameters are recalculated. However, the event is not limited to the tap event. For example, an operation event of a stable touch on a flat plate 301 such as drag (TOUCH_MOVE event) or long press (TOUCH_STILL event) in FIG. 10 can also be detected. The angle and intensity at that point of time are collected, thereby similarly updating the correction parameters and a height range R. FIG. 13 shows a state in which the angle of the fingertip changes upon drag. Especially in the drag event, since the fingertip moves during the drag, the angle of the fingertip successively changes. Hence, when the angle and intensity at each point of time are measured, and the correction parameters are updated, the intensity can be corrected more accurately.

Fourth Embodiment

In the second embodiment, the "predetermined number" in the description of the second embodiment "In step S1111, the CPU 201 determines whether the number of acquired sets of intensity values and inner product values has reached a predetermined number" is a predetermined constant enough to obtain a correction parameter by the least square method. However, the present invention is not limited to this. For example, an average value R/N obtained by dividing a residual R calculated by equation (1) by the number of angles is used as an index. When the average value is equal to or smaller than a threshold, it may be judged that the sufficient number is met.

Fifth Embodiment

Figure 14A:
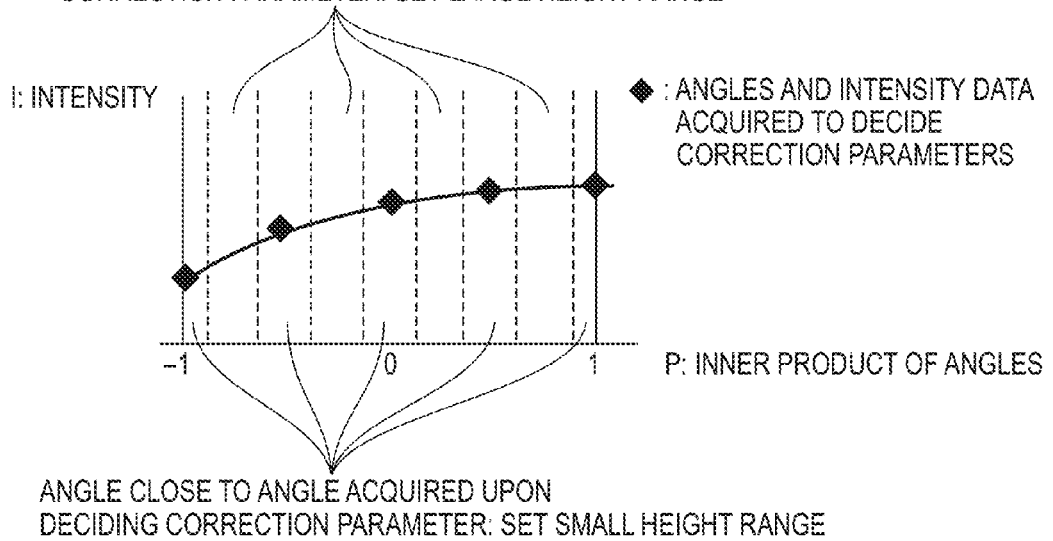
FIGS. 14A and 14B are graphs showing the plot of the angle and intensity and the quadratic curve of a decided correction parameter.
Figure 14B:
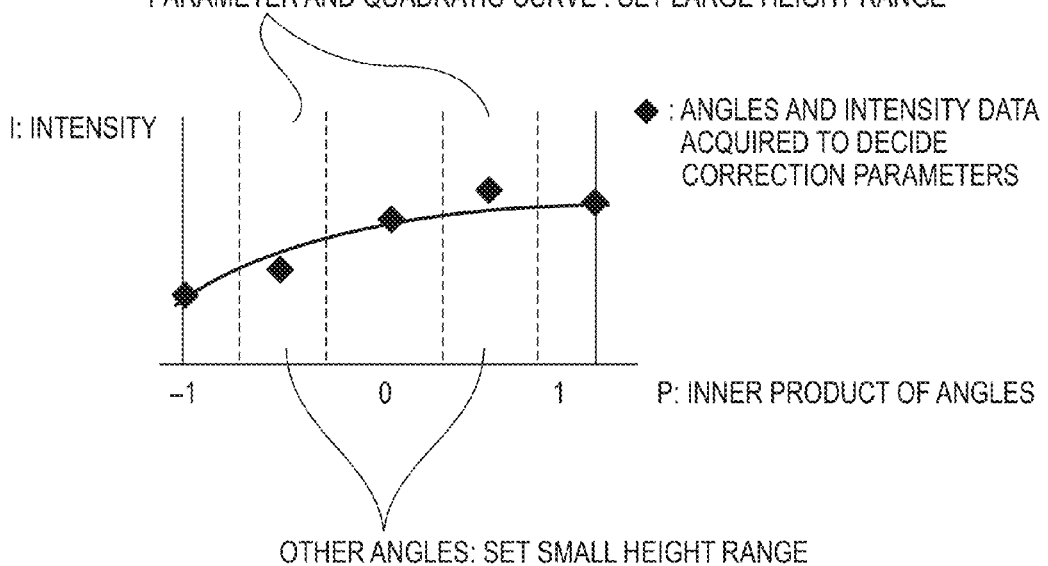

In the second embodiment, the height range Zr is changed in step S1113. In the fifth embodiment, however, the height range is set to a different value in accordance with the fingertip angle at the time of an operation. FIGS. 14A and 14B show the plot of the angle and intensity acquired in correction parameter decision processing and the quadratic curve of a decided correction parameter.

In FIG. 14A, if the fingertip angle at the time of an operation is close to the angle acquired in the correction parameter decision processing, the correction accuracy is assumed to be high, and the height range Zr is set small. On the other hand, if the fingertip angle at the time of an operation is far from the angle acquired in the correction parameter decision processing, the correction accuracy is assumed to be low, and the height range Zr is set large. This makes it possible to adjust the tap detection sensitivity in accordance with the reliability of fingertip angle correction at the time of the operation and implement more stable tap detection.

In FIG. 14B, the height range Zr is changed in accordance with the error between each angle acquired by the correction parameter decision processing and the quadratic curve obtained by the least square method. The error between the plot of each angle an intensity acquired by the correction parameter decision processing and the quadratic curve by the decided correction parameter is calculated. For the angle of the plot having a large error and angles close to it, the height range Zr is set large. This makes it possible to adjust the tap detection sensitivity in accordance with the reliability of fingertip angle correction at the time of the operation and implement more stable tap detection.

Note that the height range Zr is divided into a predetermined range for each angle of the plot in FIGS. 14A and 14B. However, the present invention is not limited to this. For example, a difference Pdiff of an angle of the plot having the smallest difference from the angle at the time of the operation is obtained, and the height range Zr may be defined as the function of Pdiff.

Sixth Embodiment

In the above-described embodiments, equation (9) is used as a transformation for converting an intensity value into a distance. However, the transformation is not limited to equation (9), and another equation may be used. Alternatively, the coefficients e, f, and g included in equation (9) may be recalculated in accordance with coordinates in an image. In this case, it is difficult to acquire fingertip intensity data of different distances in accordance with all coordinates in an image. Hence, intensity values are acquired at several lattice points, and the intensity at each coordinate point is interpolated from the intensity values of the lattice points in accordance with the coordinate position.

Seventh Embodiment

In the above-described embodiments, the direction of the finger is the direction of the finger in the captured image relative to the base axis that is set as the line having the orientation of the camera 205 in the flat plate 301 as the direction vector. However, the base axis is not limited to the line having the orientation of the camera 205 as the direction vector. For example, a line having the irradiation direction of a light source 206 as the direction vector may be set as the base axis. A direction in which the fingertip stands up on a flat plate 301 may be estimated from the change in the intensity of the finger and used.

Eighth Embodiment

Figure 15:
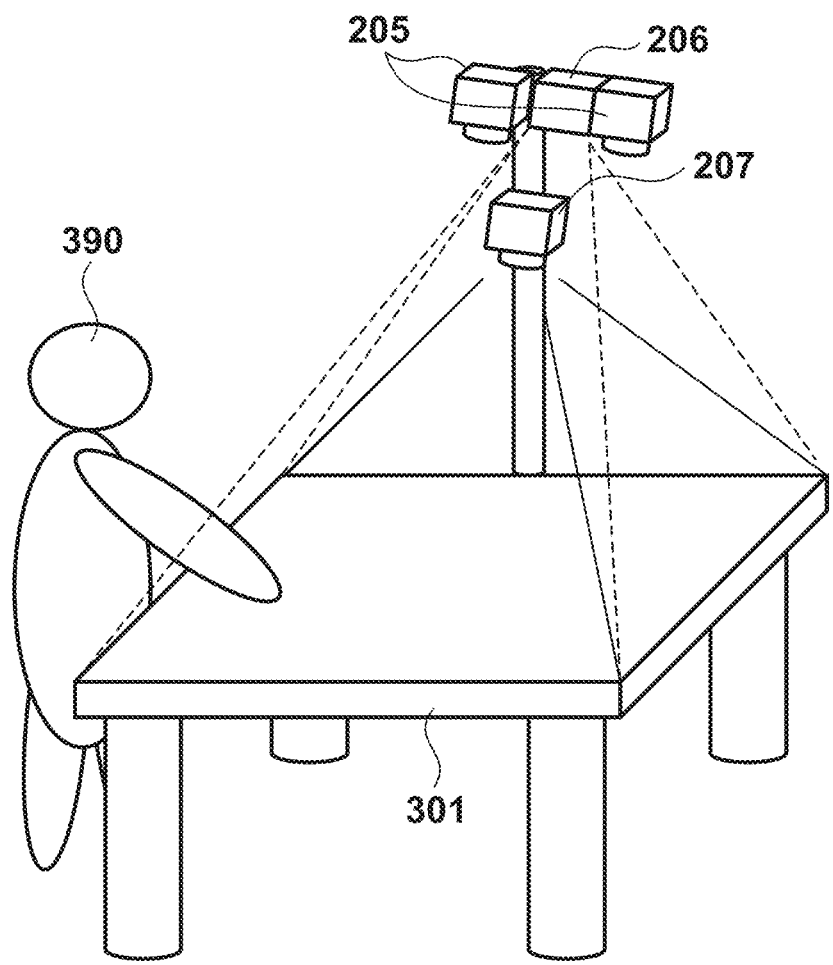
FIG. 15 is a perspective view showing a representative example of installation of the image processing apparatus.

In the above-described embodiments, the reflection intensity at the distal end portion of the pointing device operation object in the captured image by the camera 205 is corrected, and the distance is obtained by equation (10) based on the corrected intensity value. In this embodiment, a case in which a camera 205 is a stereo camera will be explained. FIG. 15 shows a representative example of installation of an image processing apparatus according to this embodiment. The same reference numerals as in FIG. 3 denote the same parts in FIG. 15. In FIG. 3, the camera 205 includes one camera. In FIG. 15, however, the camera 205 includes two cameras (that is, a stereo camera).

In this embodiment as well, since a light source 206 is an infrared light source that emits infrared light, the camera 205 is an infrared multicamera that senses the intensity of the infrared light. However, the following description is obviously not limited to the light source 206 being an infrared light source and the camera 205 being an infrared camera. In this embodiment, the camera 205 will be explained as a stereo camera including two cameras. However, the camera 205 may be a stereo camera including two or more cameras. In this embodiment as well, when detecting a human hand using, for example, flesh color detection from an image captured by a visible light camera, RGB values are handled as an intensity value.

In this embodiment, the angles between the light source, the fingertip, and the camera change between the cameras included in the camera 205. For this reason, the manner the fingertip looks and the intensity distribution change between the cameras. FIGS. 16A and 16B show this state. FIG. 16A is a view showing, when the camera 205 includes cameras A and B, the angle made by the camera A, the fingertip, and the light source and the angle made by the camera B, the fingertip, and the light source. FIG. 16B is a view showing the fingertip (upper view) viewed from the camera A in FIG. 16A and the fingertip (lower view) viewed from the camera B. As shown in FIG. 16A, the angle made by the line segment connecting the light source and the fingertip and the line segment connecting the fingertip and the camera changes between the cameras A and B. For this reason, the intensity of the fingertip changes between the cameras A and B, as shown in FIG. 16B. Especially, at this time, the place where mirror reflection occurs on, for example, the nail at the fingertip sometimes changes between the cameras A and B. If the manner the fingertip looks changes in this way, a matching error occurs when performing matching to be described later between captured images (stereo images) by the respective cameras, and an error occurs in the fingertip distance calculated based on the parallax between the stereo images.

In this embodiment, the intensity distribution is measured for each representative fingertip angle in each stereo image, thereby acquiring correction parameters. At the time of recognition, the intensity distribution of the fingertip is corrected using the correction parameters decided for the fingertip angle in each stereo image. The parallax is calculated by performing matching between the stereo images using the corrected fingertip. The distance to the fingertip is calculated based on the parallax.

Processing of obtaining correction parameters used to correct the intensity distribution of the fingertip in the captured image, which changes in accordance with the orientation of the finger on a flat plate 301, and registering (outputting) them in (to) a storage device 204 will be described next with reference to the flowchart of FIG. 17. The same step numbers as in FIG. 4 denote the same process steps in FIG. 17, and a description of these process steps will be omitted. In steps S1701 to S1704, the processes of steps S402 to S404 and S406 are performed for each stereo image. Note that in step S1704, not the inner product value between the vector (unit vector) representing the orientation of the finger in the captured image and the direction vector (unit vector) of the camera 205 in the captured image but an angle θ made by the vectors is obtained.

Figure 18A:
FIGS. 18A and 18B are views showing an intensity distribution used as a correction parameter to correct the intensity distribution of a fingertip.

In step S1705, a CPU 201 operates as an intensity measurement unit 105. That is, the CPU 201 acquires the intensity distribution of the fingertip from each stereo image. FIG. 18A shows an example of the intensity distribution of the fingertip. FIG. 18A is a view showing the fingertip intensity distribution. For an image acquired while changing the fingertip direction as in FIG. 5B, the fingertip direction is normalized in one direction based on the fingertip angle acquired in step S1704, and a predetermined region (rectangle, or the like) of the fingertip is extracted as the intensity distribution. The fingertip intensity can directly be used as the intensity distribution. Alternatively, an intensity blurred by applying a smoothing filter may be used as the intensity distribution.

After the processes of steps S401, S1701 to S1705 and S408 are performed, the process advances to step S1706 via step S407. In step S1706, the CPU 201 operates as a correction parameter decision unit 106. That is, the correction parameters are decided for each camera using the intensity distributions and angles collected by the processes of the above-described steps.

Figure 18B:
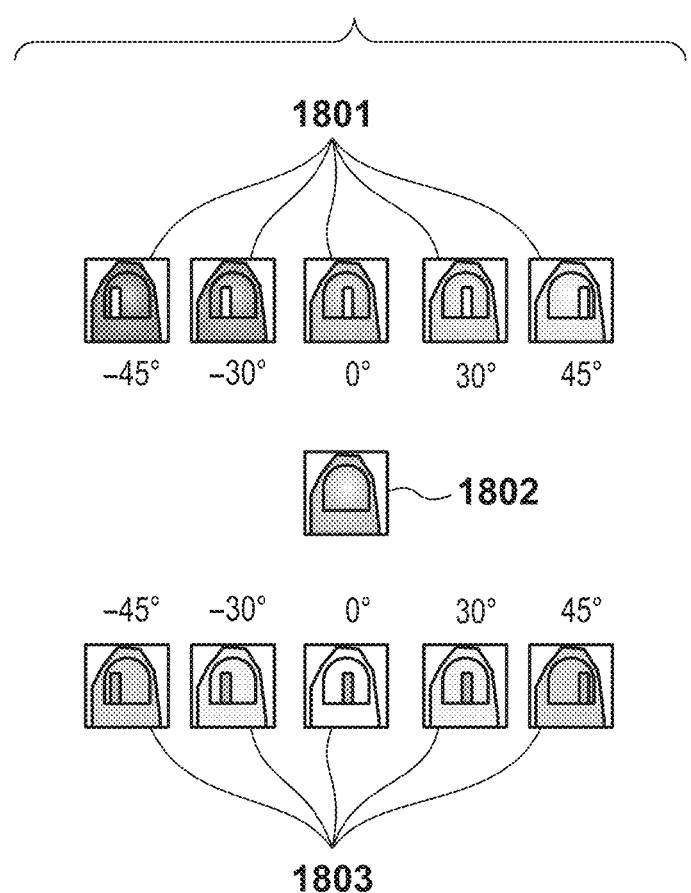
Figure 19:
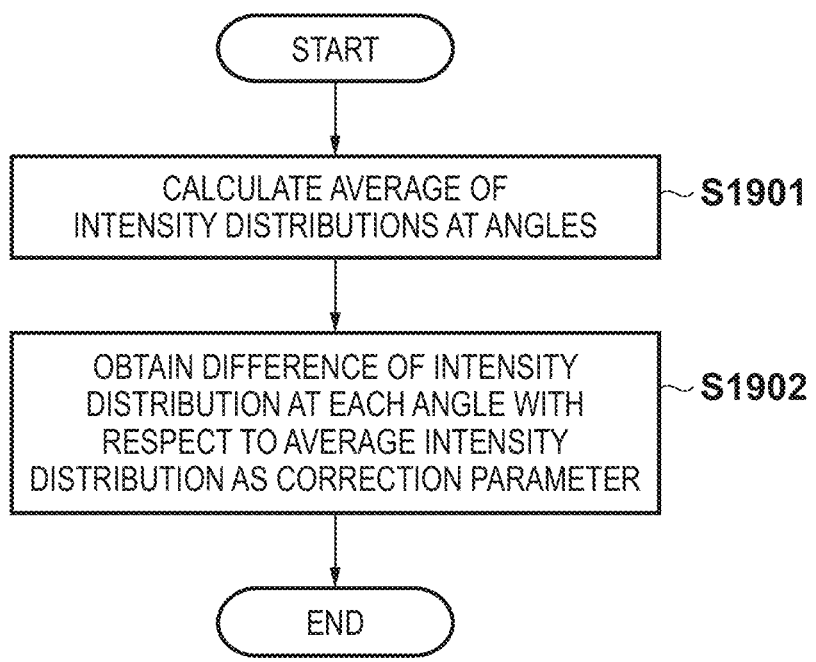
FIG. 19 is a flowchart showing details of the process of step S1706.

FIG. 18B is a view showing an intensity distribution as a correction parameter in this embodiment. Reference numeral 1801 denotes an intensity distribution of the fingertip at each angle, which is acquired in step S1705. For the intensity distribution (image), the fingertip direction is normalized in one direction, as described above. Details of the process of step S1706 will be described with reference to the flowchart of FIG. 19.

In step S1901, the average (average image) of the intensity distributions 1801 at the respective angles is calculated. Reference numeral 1802 denotes an average (average intensity distribution) of the intensity distributions 1801 at the respective angles. In the average intensity distribution, an intensity component (mirror reflection or the like) that changes depending on the angle is relaxed.

In step S1902, the difference of the intensity distribution at each angle with respect to the average intensity distribution is obtained as a correction parameter. Reference numeral 1803 denotes a difference between the average intensity distribution 1802 and the intensity distribution 1801 at each angle. This is used as a correction parameter. The thus obtained correction parameters are stored in the storage device 204. Note that the storage destination of the correction parameters is not limited to the storage device 204 and may be, for example, another apparatus that needs the correction parameters.

Figure 20:
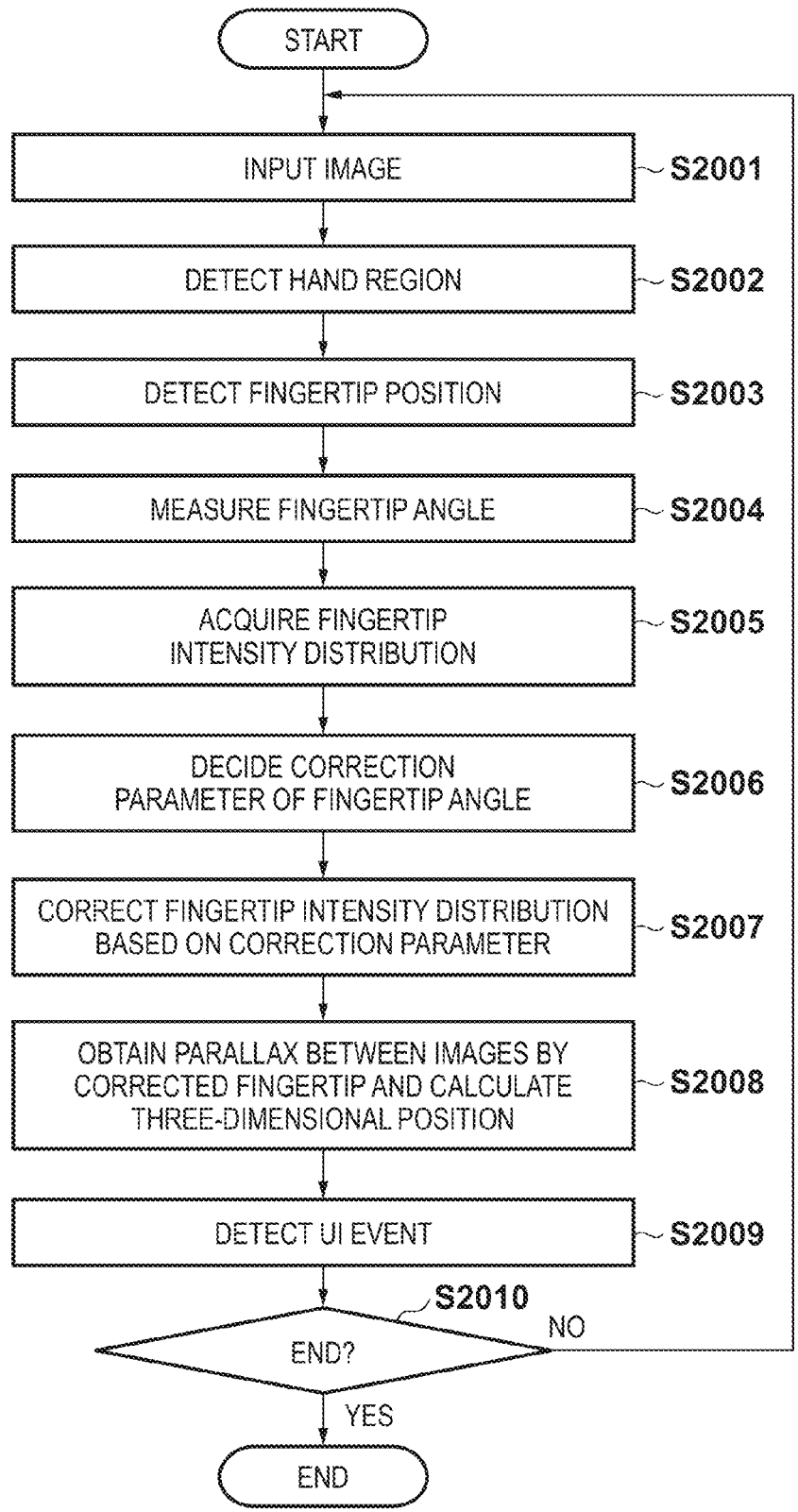
FIG. 20 is a flowchart showing processing performed by the image processing apparatus at the stage of performing a gesture operation.

Correction parameter calculation processing described above with reference to FIGS. 17 to 19 is performed in advance. Processing performed by the image processing apparatus at the stage of actually causing the user to perform a gesture operation on the flat plate 301 to do an operation input after the registration will be described next with reference to the flowchart of FIG. 20. In steps S2001 to S2004, the processes of steps S801 to S803 and S805 are performed for each stereo image. Note that in step S2004, not the inner product value between the vector (unit vector) representing the orientation of the finger in the captured image and the direction vector (unit vector) of the camera 205 in the captured image but the angle θ made by the vectors is obtained.

Figure 17:
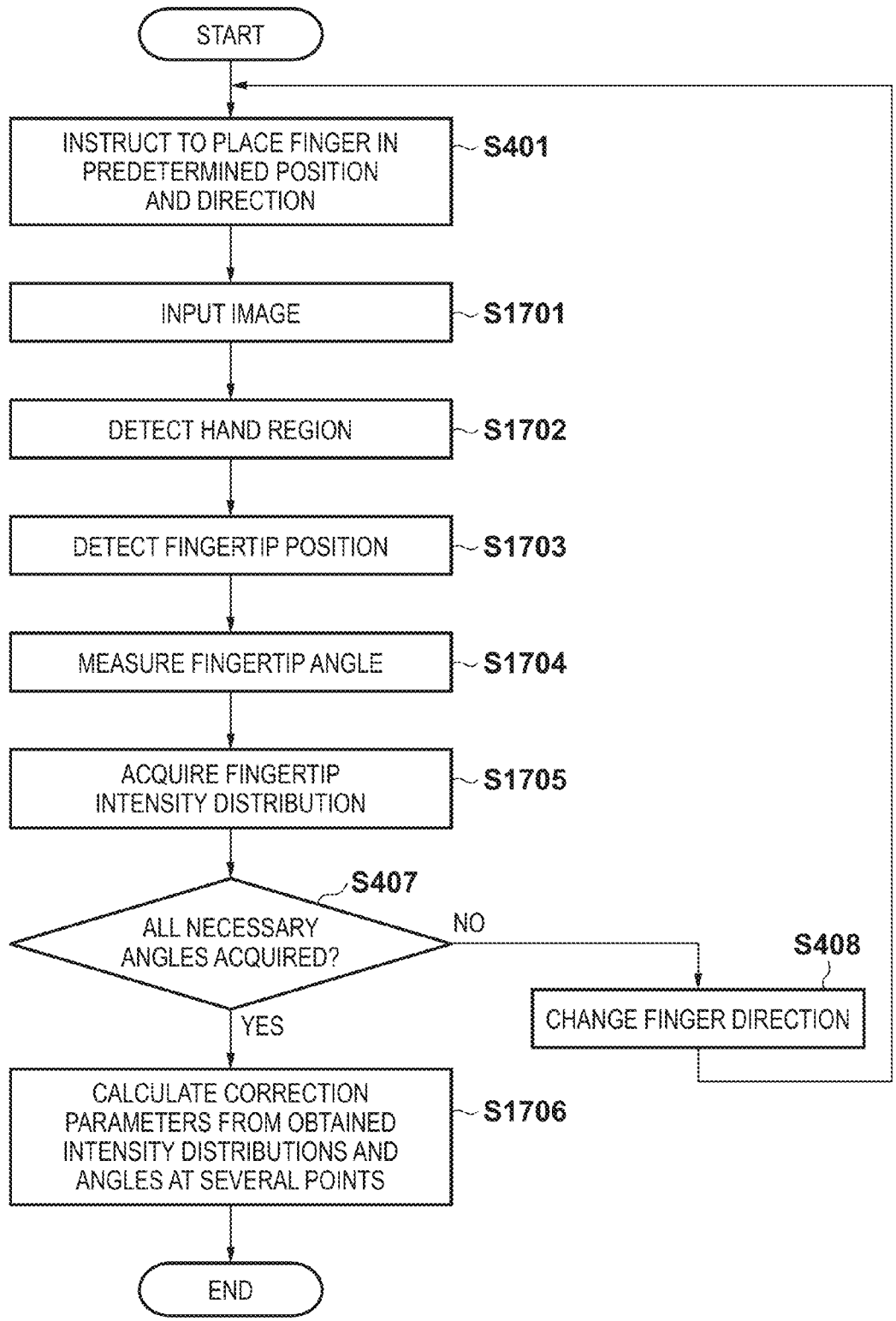
FIG. 17 is a flowchart showing processing of obtaining correction parameters and registering it in a storage device 204.

In step S2005, the intensity distribution of the fingertip is acquired from each stereo image, as in step S1705 of FIG. 17.

Figures 21A, 21B:
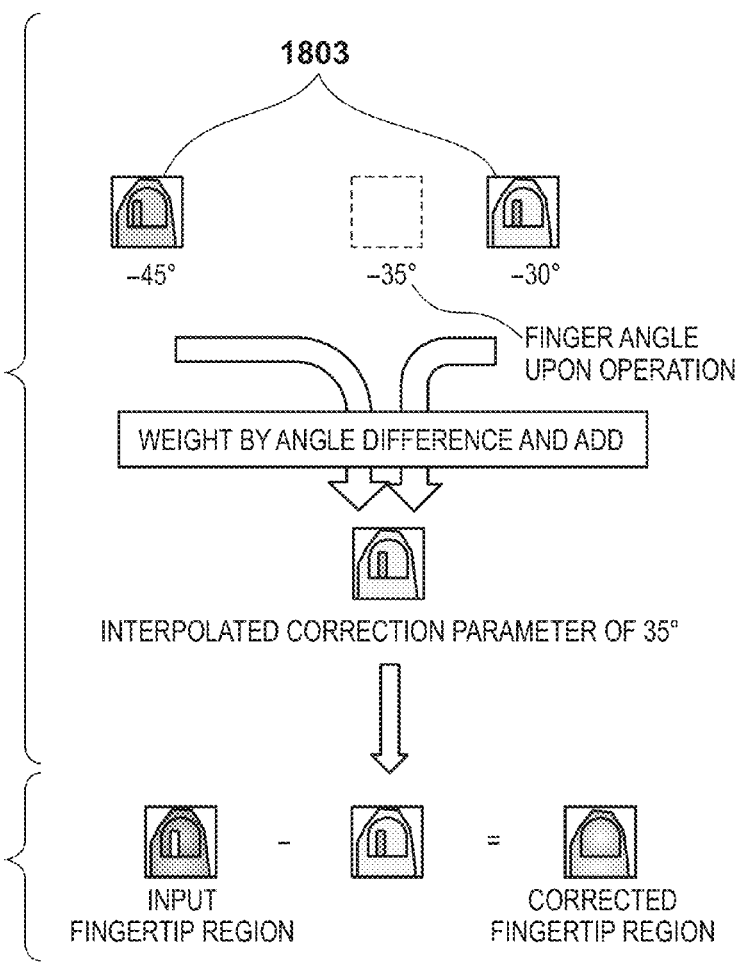
FIGS. 21A and 21B are views showing the processes of steps S2006 and S2007.

In step S2006, the CPU 201 operates as the correction parameter decision unit 106. That is, the CPU 201 decides the correction parameters for the fingertip angle obtained in step S2004. FIG. 21A shows a correction parameter decision method according to the fingertip angle. The intensity distributions of correction parameters held by the image processing apparatus in advance by the processing shown in FIG. 17 are only the intensity distributions of representative angles decided by placing the finger in several directions, as shown in FIG. 18B. Hence, in step S2006, the intensity distributions of correction parameters are combined in accordance with an arbitrary fingertip angle. Out of the intensity distributions corresponding to the discrete angles as shown in FIG. 18B, the intensity distributions of correction parameters corresponding to an angle larger than the fingertip angle and closest to the fingertip angle and an angle smaller than the fingertip angle and closest to the fingertip angle are selected. For example, as shown in FIGS. 21A and 21B, when the fingertip angle is −35°, the intensity distributions of correction parameters corresponding to −30° and −45° are selected. After weights according to the differences from the fingertip angle are added to the selected intensity distributions, the intensity distributions are combined. Referring to FIGS. 21A and 21B, the differences from the fingertip angle are 5° for −30° and 10° for −45°. Hence, the intensity distributions of −30° and −45° are combined after adding weights of 10:5=2:1, thereby obtaining the intensity distribution of correction parameter for −35°. This processing is performed for each stereo image.

In step S2007, the CPU 201 operates as an intensity correction unit 107. That is, the CPU 201 corrects the intensity distribution of the fingertip based on the decided intensity distribution of correction parameter. FIG. 21B shows this state. That is, a difference image obtained by subtracting the intensity distribution obtained in step S2006 from that acquired in step S2005 is generated as corrected fingertip intensity distribution. In the corrected fingertip intensity distribution, an intensity component (mirror reflection or like) that changes depending on the angle with respect to the camera is relaxed. At this time, since the intensity distribution (image) acquired in step S2005 is normalized in one direction, the corrected fingertip intensity distribution is returned to the original fingertip angle and position. This processing is performed for each stereo image.

Figure 22:
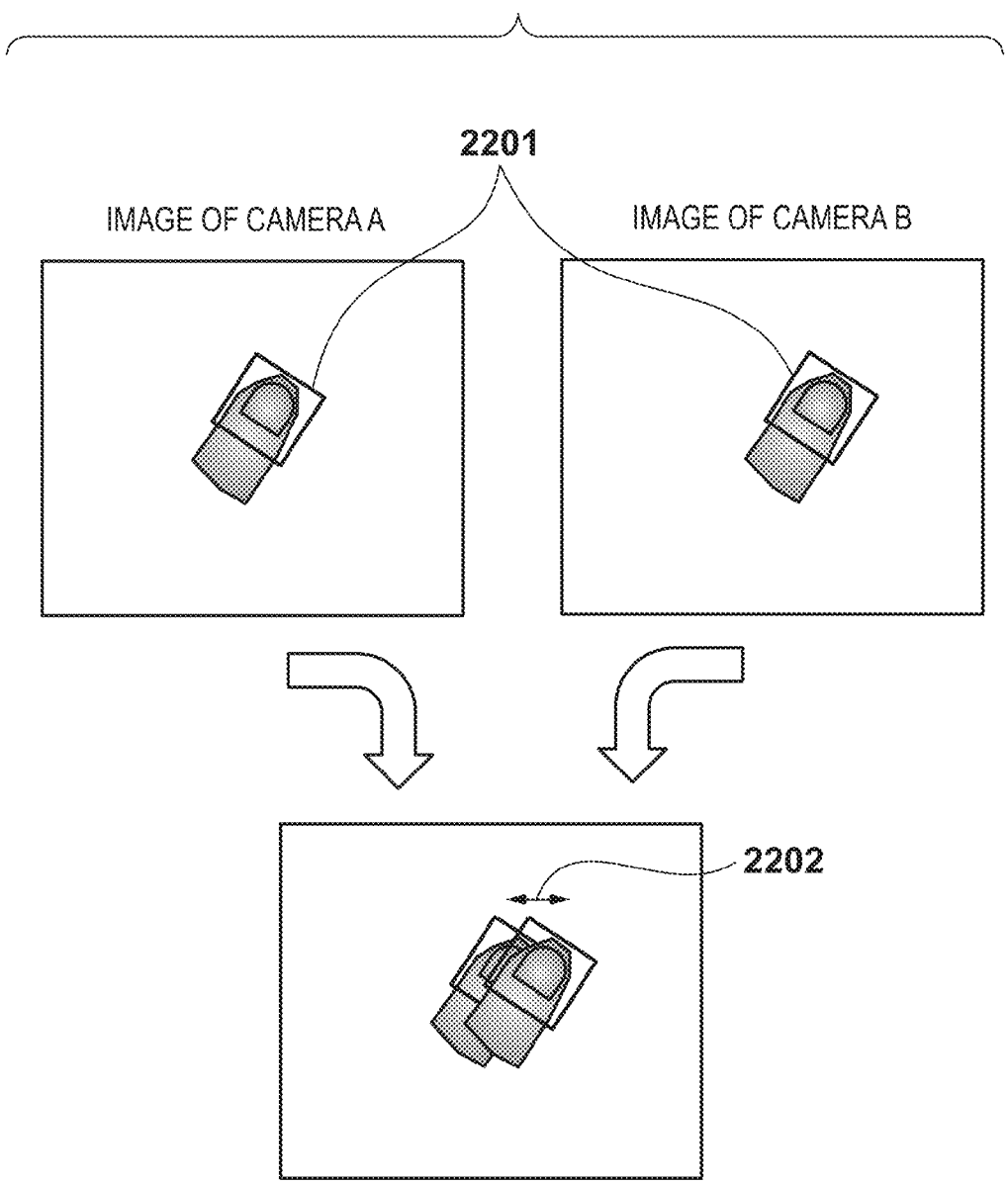
FIG. 22 is a view showing a state in which a parallax is calculated.

In step S2008, the CPU 201 operates as a three-dimensional coordinate decision unit 108. That is, the CPU 201 calculates the parallax by performing matching between the stereo images using the fingertip intensity distribution corrected in each stereo image, and measures the distance to the fingertip using the parallax. FIG. 22 is a view showing a state in which a parallax is calculated. Reference numeral 2201 denotes fingertip regions detected in the stereo image by the camera A and the stereo image by the camera B. The fingertip intensity distribution is corrected in step S2007 so that the intensity component (mirror reflection or the like) that changes depending on the angle is relaxed. The parallax is calculated by performing matching of the fingertip region between the stereo images. In FIG. 22, reference numeral 2202 denotes a parallax. Since the intensity component (mirror reflection or the like) that changes depending on the angle is relaxed, matching can be performed accurately. When the parallax is obtained, the distance to the fingertip can be calculated based on the principle of triangulation by $$Z(\text{distance}) = f(\text{focal length}) \times D(\text{stereo image distance}) / d(\text{parallax}) \quad (13)$$

With this calculation, the three-dimensional coordinate position of the fingertip in the physical space can be calculated as in the first embodiment. Steps S2009 and S2010 are the same process steps as steps S808 and S809 described above, and a description of these steps will be omitted.

In the above-described way, the intensity distribution corresponding to the fingertip angle which changes in the stereo camera is corrected. This makes it possible to relax the difference in reflection and the manner the fingertip looks between the cameras and reduce the error in distance calculation by matching between two images.

Note that in this embodiment, an example has been described in which the intensity distribution of the fingertip is corrected using an infrared light source and an infrared camera. However, the present invention is not limited to this. For example, the RGB intensity values of the fingertip may be corrected using a white light source and an RGB stereo camera.

Other Embodiments

Embodiments of the present invention can also be realized by a computer of a system or apparatus that reads out and executes computer executable instructions recorded on a storage medium (for example, non-transitory computer-readable storage medium) to perform the functions of one or more of the above-described embodiment(s) of the present invention, and by a method performed by the computer of the system or apparatus by, for example, reading out and executing the computer executable instructions from the storage medium to perform the functions of one or more of the above-described embodiment(s). The computer may comprise one or more of a central processing unit (CPU), micro processing unit (MPU), or other circuitry, and may include a network of separate computers or separate computer processors. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital

What is claimed is:

1. An information processing apparatus for recognizing a touch operation on a target surface by an operation object being irradiated with light from a light source, comprising:
   a non-transitory memory device;
   a processor;
   a position specification unit configured to specify a designation position designated by the operation object based on a captured image that is captured by a capturing unit and reflects distance information between the capturing unit and the operation object;
   a direction specification unit configured to specify, based on the captured image, a direction of the operation object with respect to the capturing unit or the light source; and
   a determination unit configured to (i) correct, based on the specified direction of the operation object and a correction parameter which is used for converting to a reference intensity value of the operation object having a reference direction and which has been obtained in advance based on past captured images of the operation object which have been captured for different directions of the operation object, an intensity value of a portion corresponding to the designation position out of the captured image so as to be the reference intensity value, wherein the intensity value depends on the specified direction of the operation object with respect to the capturing unit or the light source, and (ii) determine, based on the corrected intensity value, that a distance between the operation object and the target surface is smaller than a threshold,
   wherein the position specification unit, the direction specification unit, and the determination unit are implemented at least in part by the processor executing at least one program recorded on the non-transitory memory device.

2. The apparatus according to claim 1, further comprising a recognition unit configured to recognize an operation being made by the operation object, when the determination unit determines that the distance is smaller than the threshold,
   wherein the recognition unit is implemented at least in part by the processor executing at least one program recorded on the non-transitory memory device.

3. The apparatus according to claim 2, wherein the operation is the touch operation being made by the operation object.

4. The apparatus according to claim 1, wherein the position specification unit specifies a position of a distal end portion of the operation object as the designation position.

5. The apparatus according to claim 1, wherein an image to be processed by the position specification unit and the direction specification unit is an image of a region including the operation object being obtained by background subtraction.

6. The apparatus according to claim 1, wherein the captured image is an image obtained by capturing reflected light of light that irradiates the operation object.

7. The apparatus according to claim 1, wherein the captured image is an image obtained by capturing reflected light of infrared light that irradiates the operation object, and the intensity value is an infrared intensity value.

8. The apparatus according to claim 1, wherein the correction parameter is acquired from a pre-calibration operation.

9. The apparatus according to claim 1, wherein the intensity value of the portion corresponding to the designation position is an intensity distribution at a peripheral portion of the designation position.

10. The apparatus according to claim 1, wherein the captured image includes images obtained from at least two capturing units.

11. The apparatus according to claim 1, wherein the captured image is an image captured by a visible light camera, and the intensity value is a pixel value.

12. The apparatus according to claim 1, wherein the position specification unit specifies coordinates of the designation position on an x-y plane, and the direction specification unit decides a coordinate in a z-axis direction.

13. An information processing apparatus for recognizing a touch operation on a target surface by an operation object being irradiated with light from a light source, comprising:
    a non-transitory memory device;
    a processor;
    a position specification unit configured to specify a position of a distal end portion of the operation object based on a captured image obtained by causing a capturing unit to capture the operation object;
    a direction specification unit configured to specify, based on the captured image, an orientation of the distal end portion of the operation object with respect to the capturing unit or the light source; and
    a recognition unit configured to (i) correct, based on the specified orientation of the distal end portion of the operation object and a correction parameter which is used for converting to a reference intensity value of the distal end portion of the operation object having a reference orientation and which has been obtained in advance based on past captured images of the distal end portion of the operation object which have been captured for different orientations of the distal end portion of the operation object, an intensity value of a portion corresponding to the specified position out of the captured image so as to be the reference intensity value, wherein the intensity value depends on the specified orientation of the distal end portion of the operation object with respect to the capturing unit or the light source, and (ii) recognize, based on the corrected intensity value, a touch on the target surface by the distal end portion of the operation object,
    wherein the position specification unit, the direction specification unit, and the recognition unit are implemented at least in part by the processor executing at least one program recorded on the non-transitory memory device.

14. An information processing method of recognizing a touch operation on a target surface by an operation object being irradiated with light from a light source, comprising:
    specifying a designation position designated by the operation object based on a captured image that is captured by a capturing unit and reflects distance information between the capturing unit and the operation object;
    specifying, based on the captured image, a direction of the operation object with respect to the capturing unit or the light source;
    correcting, based on the specified direction of the operation object and a correction parameter which is used for converting to a reference intensity value of the operation object having a reference direction and which has been obtained in advance based on past captured images of the operation object which have been captured for different directions of the operation object, an intensity value of a portion corresponding to the designation position out of the captured image so as to be the reference intensity value, wherein the intensity value depends on the specified direction of the operation object with respect to the capturing unit or the light source; and
determining, based on the corrected intensity value, that a distance between the operation object and the target surface is smaller than a threshold.

* * * * *